(12) United States Patent
Ajito

(10) Patent No.: US 10,386,702 B2
(45) Date of Patent: Aug. 20, 2019

(54) IMAGE PICKUP SYSTEM, IMAGE PICKUP APPARATUS, AND INTERCHANGEABLE LENS

(71) Applicant: Olympus Corporation, Hachioji-shi, Tokyo (JP)

(72) Inventor: Takeyuki Ajito, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/890,304

(22) Filed: Feb. 6, 2018

(65) Prior Publication Data

US 2018/0157152 A1    Jun. 7, 2018

Related U.S. Application Data

(63) Continuation of application No. PCT/JP2015/086523, filed on Dec. 28, 2015.

(30) Foreign Application Priority Data

Aug. 25, 2015    (JP) ................. 2015-165865

(51) Int. Cl.
*H04N 5/232* (2006.01)
*G03B 17/14* (2006.01)
(Continued)

(52) U.S. Cl.
CPC ............. *G03B 17/14* (2013.01); *H04N 5/232* (2013.01); *H04N 5/23296* (2013.01);
(Continued)

(58) Field of Classification Search
CPC ........ H04N 5/232; H04N 5/357; H04N 5/369; G03B 17/14
See application file for complete search history.

(56) References Cited

U.S. PATENT DOCUMENTS

2008/0239099 A1* 10/2008 Abe ................ H04N 5/217
                                                  348/231.99
2009/0297060 A1* 12/2009 Hattori ............. G06T 11/00
                                                  382/275
(Continued)

FOREIGN PATENT DOCUMENTS

JP    02-123879    5/1990
JP    2008-252522    10/2008
(Continued)

OTHER PUBLICATIONS

International Search Report ("ISR") to corresponding International Application No. PCT/JP2015/086523, dated Feb. 9, 2016 (1 pg.), with translation (1 pg.).

*Primary Examiner* — Abdelaaziz Tissire
(74) *Attorney, Agent, or Firm* — John C. Pokotylo; Pokotylo Patent Services

(57) ABSTRACT

An image pickup system includes an interchangeable lens and an image pickup apparatus body, the interchangeable lens including a lens characteristic data storage portion, and a communication portion, the image pickup apparatus body including a solid-state image pickup device configured to output first image data, an image processing portion configured to perform distortion aberration correction processing on the first image data, and output second image data, and a correction coefficient calculation portion configured to compare information on an image height of the second image data with the information on the image height range supporting the read-out distortion aberration characteristic information and, if the image height of the second image data falls within the range, calculate a distortion aberration correction coefficient on the basis of corresponding distortion aberration characteristic. The image processing portion performs the distortion aberration correction processing (Continued)

[LENS DATA]

| UPPER LIMIT ACTUAL IMAGE HEIGHT (%) | LENS ABERRATION DATA SET |
|---|---|
| 100 | DISTORTION ABERRATION COEFFICIENT SET 0 (FOR WHOLE ANGLE OF VIEW) |
|  | LATERAL CHROMATIC ABERRATION COEFFICIENT SET 0 (FOR WHOLE ANGLE OF VIEW) |
| 60 | DISTORTION ABERRATION COEFFICIENT SET 1 (FOR NARROW ANGLE OF VIEW) |
|  | LATERAL CHROMATIC ABERRATION COEFFICIENT SET 1 (FOR NARROW ANGLE OF VIEW) |
| 40 | DISTORTION ABERRATION COEFFICIENT SET 2 (FOR NARROW ANGLE OF VIEW) |
|  | LATERAL CHROMATIC ABERRATION COEFFICIENT SET 2 (FOR NARROW ANGLE OF VIEW) | using the calculated distortion aberration correction coefficient.

12 Claims, 12 Drawing Sheets

(51) Int. Cl.
*H04N 5/369* (2011.01)
*H04N 5/357* (2011.01)

(52) U.S. Cl.
CPC ........... *H04N 5/357* (2013.01); *H04N 5/3572* (2013.01); *H04N 5/369* (2013.01); *G03B 2206/00* (2013.01)

(56) References Cited

U.S. PATENT DOCUMENTS

2012/0013997 A1\* 1/2012 Yamanaka ............... G02B 7/10
359/701
2013/0265468 A1 10/2013 Morimura
2017/0257574 A1\* 9/2017 Honjo ................ H04N 5/23287

FOREIGN PATENT DOCUMENTS

| JP | 2008-301034 | 12/2008 |
| JP | 2012-142885 | 7/2012 |
| WO | WO 2012/093453 | 7/2012 |

\* cited by examiner

FIG. 4

[LENS DATA]

| UPPER LIMIT ACTUAL IMAGE HEIGHT (%) | LENS ABERRATION DATA SET |
|---|---|
| 100 | DISTORTION ABERRATION COEFFICIENT SET 0 (FOR WHOLE ANGLE OF VIEW) |
| | LATERAL CHROMATIC ABERRATION COEFFICIENT SET 0 (FOR WHOLE ANGLE OF VIEW) |
| 60 | DISTORTION ABERRATION COEFFICIENT SET 1 (FOR NARROW ANGLE OF VIEW) |
| | LATERAL CHROMATIC ABERRATION COEFFICIENT SET 1 (FOR NARROW ANGLE OF VIEW) |
| 40 | DISTORTION ABERRATION COEFFICIENT SET 2 (FOR NARROW ANGLE OF VIEW) |
| | LATERAL CHROMATIC ABERRATION COEFFICIENT SET 2 (FOR NARROW ANGLE OF VIEW) |

FIG. 5

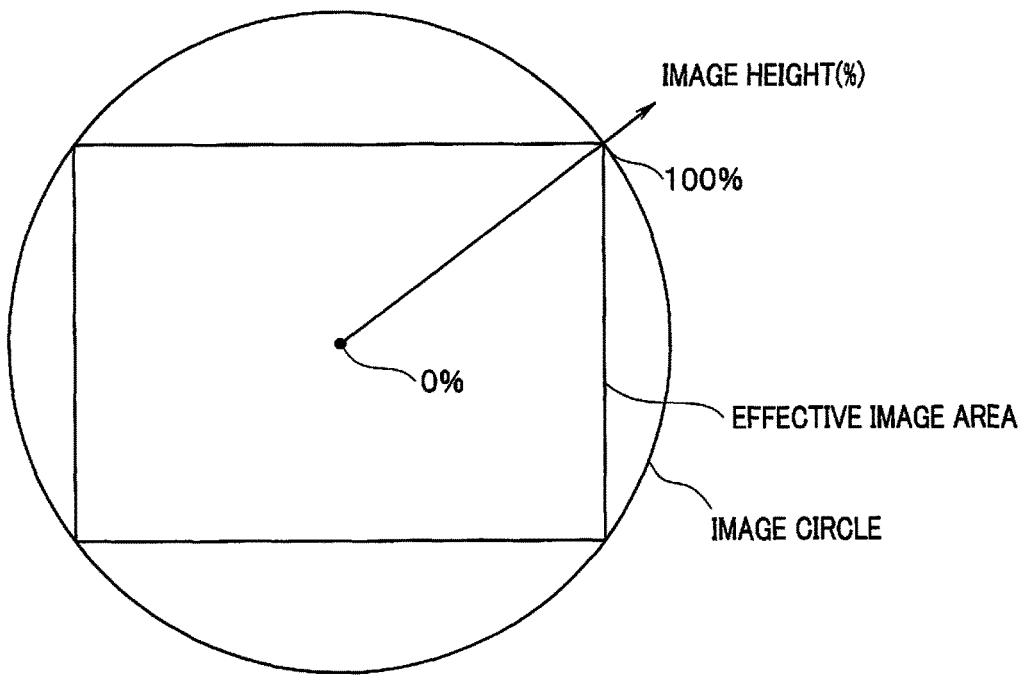

FIG. 6

[DISTORTION ABERRATION COEFFICIENT SET]

|  | ZOOM POSITION 1 | | | ZOOM POSITION 2 | | | ... | ZOOM POSITION 5 | | |
|---|---|---|---|---|---|---|---|---|---|---|
|  | THIRD-ORDER | FIFTH-ORDER | SEVENTH-ORDER | THIRD-ORDER | FIFTH-ORDER | SEVENTH-ORDER | ... | THIRD-ORDER | FIFTH-ORDER | SEVENTH-ORDER |
| FOCUS POSITION 1 | a1 | b1 | c1 | a6 | b6 | c6 | ... | a21 | b21 | c21 |
| FOCUS POSITION 2 | a2 | b2 | c2 | a7 | b7 | c7 | ... | a22 | b22 | c22 |
| ... | ... | ... | ... | ... | ... | ... | ... | ... | ... | ... |
| FOCUS POSITION 5 | a5 | b5 | c5 | a10 | b10 | c10 | ... | a25 | b25 | c25 |

FIG. 7

[LATERAL CHROMATIC ABERRATION COEFFICIENT SET]

|  |  | ZOOM POSITION 1 | | | ZOOM POSITION 2 | | | ... | ZOOM POSITION 5 | | |
|---|---|---|---|---|---|---|---|---|---|---|---|
|  |  | FIRST-ORDER | THIRD-ORDER | FIFTH-ORDER | FIRST-ORDER | THIRD-ORDER | FIFTH-ORDER | ... | FIRST-ORDER | THIRD-ORDER | FIFTH-ORDER |
| FOCUS POSITION 1 | R | d1 | e1 | f1 | d6 | e6 | f6 | ... | d21 | e21 | f21 |
|  | B | g1 | h1 | i1 | g6 | h6 | i6 | ... | g21 | h21 | i21 |
| FOCUS POSITION 2 | R | d2 | e2 | f2 | d7 | e7 | f7 | ... | d22 | e22 | f22 |
|  | B | g2 | h2 | i2 | g7 | h7 | i7 | ... | g22 | h22 | i22 |
| ... | ... | ... | ... | ... | ... | ... | ... | ... | ... | ... | ... |
| FOCUS POSITION 5 | R | d5 | e5 | f5 | d10 | e10 | f10 | ... | d25 | e25 | f25 |
|  | B | g5 | h5 | i5 | g10 | h10 | i10 | ... | g25 | h25 | i25 |

[DIAGONAL IDEAL IMAGE HEIGHT AND OUTPUT IMAGE AREA FOR ELECTRONIC ZOOM MAGNIFICATION AND ASPECT RATIO]

| ELECTRONIC ZOOM MAGNIFICATION | ASPECT RATIO | DIAGONAL IDEAL IMAGE HEIGHT (%) | OUTPUT IMAGE AREA | | |
|---|---|---|---|---|---|
| | | | START POSITION | PIXEL COUNT | |
| x1.0 | 4:3 | 100 | (0, 0) | ... | |
| | 16:9 | 91 | ... | ... | [※2] |
| | 1:1 | 84 | ... | ... | |
| x1.5 | 4:3 | 66 | ... | ... | |
| | 16:9 | 60 | ... | ... | |
| | 1:1 | 56 | ... | ... | |
| x2.0 | 4:3 | 50 | ... | ... | [※1] |
| | 16:9 | 45 | ... | ... | |
| | 1:1 | 42 | ... | ... | |
| x3.0 | 4:3 | 33 | ... | ... | |
| | 16:9 | 30 | ... | ... | |
| | 1:1 | 28 | ... | ... | |
| x4.0 | 4:3 | 25 | ... | ... | |
| | 16:9 | 22 | ... | ... | |
| | 1:1 | 21 | ... | ... | |

[DIAGONAL IDEAL IMAGE HEIGHT AND OUTPUT IMAGE AREA WHEN ELECTRONIC ZOOM MAGNIFICATION IS SET TO 2.0x, AND ASPECT RATIO IS SET TO 4:3]

FIG. 12

[LENS DATA FOR FISHEYE LENS]

| UPPER LIMIT ACTUAL IMAGE HEIGHT (%) | LENS ABERRATION DATA SET |
|---|---|
| 100 | DISTORTION ABERRATION CORRECTION DISABLING DATA (FOR WHOLE ANGLE OF VIEW) |
| | LATERAL CHROMATIC ABERRATION COEFFICIENT SET 0 (FOR WHOLE ANGLE OF VIEW) |
| 60 | DISTORTION ABERRATION COEFFICIENT SET 1 (FOR NARROW ANGLE OF VIEW) |
| | LATERAL CHROMATIC ABERRATION COEFFICIENT SET 1 (FOR NARROW ANGLE OF VIEW) |
| 40 | DISTORTION ABERRATION COEFFICIENT SET 2 (FOR NARROW ANGLE OF VIEW) |
| | LATERAL CHROMATIC ABERRATION COEFFICIENT SET 2 (FOR NARROW ANGLE OF VIEW) |

FIG. 13

[DIAGONAL IDEAL IMAGE HEIGHT FOR ELECTRONIC ZOOM MAGNIFICATION AND ASPECT RATIO]

| ELECTRONIC ZOOM MAGNIFICATION | ASPECT RATIO | DIAGONAL IDEAL IMAGE HEIGHT (%) |
|---|---|---|
| x1.0 | 4:3 | 100 |
| | 16:9 | 91 |
| | 1:1 | 84 |
| x1.6 | 4:3 | 62 |
| | 16:9 | 56 |
| | 1:1 | 52 |
| x2.0 | 4:3 | 50 |
| | 16:9 | 45 |
| | 1:1 | 42 |
| x3.0 | 4:3 | 33 |
| | 16:9 | 30 |
| | 1:1 | 28 |
| x4.0 | 4:3 | 25 |
| | 16:9 | 22 |
| | 1:1 | 21 |

[TABLE OF COMPARISON BETWEEN SETTABLE ELECTRONIC ZOOM MAGNIFICATION AND EQUIVALENT FOCAL LENGTH]

| ELECTRONIC ZOOM MAGNIFICATION | ASPECT RATIO | DIAGONAL IMAGE HEIGHT (%) | EQUIVALENT FOCAL LENGTH (mm) |
|---|---|---|---|
| x1.0 | 4:3 | 100 | ... |
| | 16:9 | 91 | |
| | 1:1 | 84 | |
| x1.6 | 4:3 | 62 | 8.5 |
| | 16:9 | 56 | |
| | 1:1 | 52 | |
| x2.0 | 4:3 | 50 | 13 |
| | 16:9 | 45 | |
| | 1:1 | 42 | |
| x3.0 | 4:3 | 33 | 22 |
| | 16:9 | 30 | |
| | 1:1 | 28 | |
| x4.0 | 4:3 | 25 | 30 |
| | 16:9 | 22 | |
| | 1:1 | 21 | |

IMAGE PICKUP SYSTEM, IMAGE PICKUP APPARATUS, AND INTERCHANGEABLE LENS

CROSS REFERENCE TO RELATED APPLICATION

This application is a continuation application of PCT/JP2015/086523 filed on Dec. 28, 2015 and claims benefit of Japanese Application No. 2015-165865 filed in Japan on Aug. 25, 2015, the entire contents of which are incorporated herein by this reference.

BACKGROUND OF THE INVENTION

1. Field of the Invention

The invention relates to a lens-interchangeable type image pickup system composed of an interchangeable lens and an image pickup apparatus and, more particularly, to an image pickup system for executing a distortion aberration correction processing method and a distortion aberration correction processing program among image processes to be executed in the image pickup system.

2. Description of the Related Art

A conventional image pickup system is configured to sequentially perform photoelectric conversion on an optical image formed by an image pickup optical system using an image pickup device (e.g., a photoelectric conversion element like a CCD (charge coupled device) image sensor or a CMOS (complementary metal oxide semiconductor) type image sensor), include a signal processing circuit which generates image data in predetermined form (e.g., a digital image data representing a still image or a movie) on the basis of image signals acquired through the photoelectric conversion and a control circuit, record the image data thus generated on a storage medium, and include an image display apparatus (e.g., a liquid crystal display (LCD) apparatus or an organic electro-luminescence (OEL) display apparatus) which displays the still image or the movie on the basis of the digital image data. The image pickup system has been generally put to practical use and is in widespread use.

Of image pickup systems of the above-described type, a so-called lens-interchangeable type image pickup system is in practical use. The image pickup system is composed of an image pickup apparatus body incorporating various constituent units, such as the image pickup device, the signal processing circuit and the control circuit, the storage medium, and the image display apparatus described above, and an interchangeable lens portion including the image pickup optical system described above and configured to be detachable from the image pickup apparatus body.

Conventional lens-interchangeable type image pickup systems include an image pickup system configured to store, in advance, information unique to an interchangeable lens, such as lens data including lens type information and a distortion aberration characteristic, on a lens side and configured such that a control portion on an image pickup apparatus body side reads out the lens data (the unique data including the distortion aberration characteristic and the like) stored on the interchangeable lens side and performs distortion aberration correction processing on image data obtained as a result of image pickup operation by the image pickup apparatus using the lens data when the image pickup system is used with the interchangeable lens attached to an image pickup apparatus body. Various image pickup systems of the type have been proposed by, for example, Japanese Patent Application Laid-Open Publication No. 2-123879 and put to practical use.

An image pickup system disclosed in Japanese Patent Application Laid-Open Publication No. 2008-301034 or the like clips part of acquired image data and performs distortion aberration correction processing on a clipped image in an image pickup apparatus with a fixedly attached fisheye lens.

However, if a fisheye lens is used as an interchangeable lens in an image pickup system including an interchangeable lens, the fisheye lens is extremely different in a shape, magnitude, and the like of skew of an optical image from a normal interchangeable lens (e.g., a zoom lens or a wide-angle lens), and distortion and the like of an image specific to fisheye lenses tend to be preferred as a photographic representation. In view of the respect, it is common for a conventional image pickup system not to provide a fisheye lens as an interchangeable lens with lens data including a distortion aberration characteristic and the like, which are caused to be stored in advance in a normal interchangeable lens or the like and form an image with distortion and the like left without performing distortion aberration correction processing and the like on acquired image data at the time of image pickup operation by the image pickup system.

In recent image pickup systems, image clip processing or the like called an electronic zoom function or the like is generally performed. The electronic zoom function (image clip processing) is, for example, a function of acquiring and recording an image with an angle of view different from an original angle of view of an attached interchangeable lens by performing a process of clipping an area within a predetermined range based on an approximately central area from an image acquired using a whole image area of a solid-state image pickup device. With use of the electronic zoom function, for example, one interchangeable lens can be used while being caused to support various angles of view. Thus, a user need not prepare and carry a large number of interchangeable lenses different in focal length, and weight of equipment to carry can be reduced, which is convenient for the user.

SUMMARY OF THE INVENTION

An image pickup system according to one aspect of the present invention is an image pickup system including an image pickup apparatus body and an interchangeable lens detachable from the image pickup apparatus body, the interchangeable lens including a lens characteristic data storage portion configured to store distortion aberration characteristic information which can be supported by an image height range narrower than an image circle of the interchangeable lens in association with information on the image height range, and a communication portion capable of communicating the distortion aberration characteristic information and the information on the image height range read out from the lens characteristic data storage portion with the image pickup apparatus body, the image pickup apparatus body including a solid-state image pickup device configured to photoelectrically convert an optical image formed through the interchangeable lens and output first image data, an image processing portion configured to receive the inputted first image data, perform a series of image processes including at least distortion aberration correction processing, and output second image data, and a correction coefficient calculation portion configured to compare information on an image height of the second image data outputted from the image processing portion with the information on the image height range that can support the distortion aberration characteristic information read out from the interchangeable lens and, if the image height of the second image data falls within the image height range, calculate a distortion aberration correction coefficient on the basis of a distortion aberration characteristic corresponding to the image height. The image processing portion performs the distortion aberration correction processing using the distortion aberration correction coefficient calculated by the correction coefficient calculation portion.

An image pickup apparatus according to one aspect of the present invention includes a solid-state image pickup device configured to photoelectrically convert an optical image formed through an optical lens and output first image data, an image processing portion configured to receive the inputted first image data, perform a series of image processes including at least distortion aberration correction processing, and output second image data, and a correction coefficient calculation portion configured to compare information on an image height of the second image data outputted from the image processing portion with information on an image height range which can support distortion aberration characteristic information read out from an interchangeable lens and, if the image height of the second image data falls within the image height range, calculate a distortion aberration correction coefficient on the basis of a distortion aberration characteristic corresponding to the image height. The image processing portion performs distortion aberration correction processing using the distortion aberration correction coefficient calculated by the correction coefficient calculation portion.

An interchangeable lens according to one aspect of the present invention is an interchangeable lens including an image pickup optical system, including a lens characteristic data storage portion configured to store distortion aberration characteristic information which can be supported by an image height range narrower than an image circle of the image pickup optical system in association with information on the image height range, and a communication portion capable of communicating the distortion aberration characteristic information and the information on the image height range read out from the lens characteristic data storage portion with an image pickup apparatus body. The distortion aberration characteristic information stored in the lens characteristic data storage portion includes respective pieces of distortion aberration characteristic information corresponding to a plurality of upper limit actual image heights.

BRIEF DESCRIPTION OF THE DRAWINGS

FIG. 4 is a list showing a concrete example of lens data to be stored in advance in a lens data storage portion in the image pickup system in FIG. 1;

FIG. 5 is a schematic chart showing a relation among an effective image area of an image pickup device, an image circle of an interchangeable lens, and an image height in the image pickup system in FIG. 1;

FIG. 6 is an illustration of a distortion aberration coefficient set in the list in FIG. 4;

FIG. 7 is an illustration of a lateral chromatic aberration coefficient set in the list in FIG. 4;

FIG. 12 is a list showing an example of lens data to be stored in advance in the lens data storage portion in a case employing a fisheye lens in the image pickup system in FIG. 1;

FIG. 13 is a data list of diagonal ideal image height data corresponding to setup values for the electronic zoom magnification and the aspect ratio in the case employing the fisheye lens in the image pickup system in FIG. 1;

DETAILED DESCRIPTION OF THE PREFERRED EMBODIMENTS

Figure 1:
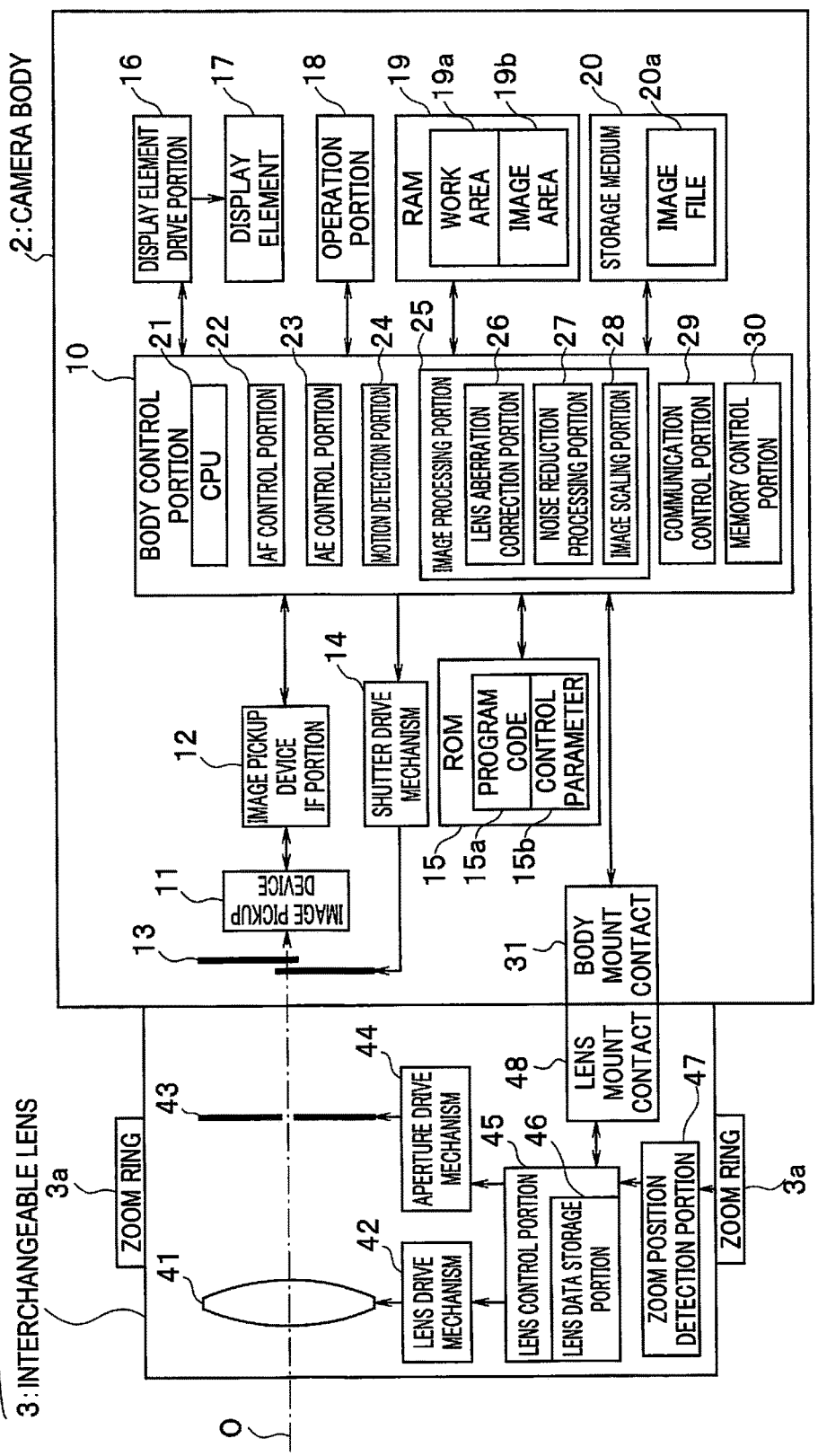
FIG. 1 is a block configuration diagram showing a configuration of an image pickup system according to one embodiment of the present invention.

The present invention will be described below in the context of an embodiment illustrated in the drawings. The individual drawings used for the following description provide schematic illustration. To illustrate individual components on the drawings to a recognizable extent, dimensional relations, scales, and the like of individual members may be differently illustrated for each component. Therefore, the present invention is not limited only to an illustrated form in quantities of the components illustrated in the individual drawings, shapes of the components, ratios among sizes of the components, a relative positional relation among the individual components, and the like.

Note that one embodiment of the present invention illustrates an image pickup system which is composed of an image pickup apparatus body and an interchangeable lens barrel. The image pickup apparatus body is configured to be capable of photoelectrically converting an optical image formed by, for example, an optical lens using a solid-state image pickup device, converting image signals obtained through the photoelectric conversion into digital data representing a still image or a movie, recording the digital image data thus generated on a storage medium, and playing and displaying the still image or the movie on a display apparatus on the basis of the digital image data recorded on the storage medium. The interchangeable lens barrel is configured to be detachable from the image pickup apparatus body.

A schematic configuration of the image pickup system according to the one embodiment of the present invention will be described below with reference to FIG. 1. FIG. 1 is a block configuration diagram showing the configuration of the image pickup system according to the one embodiment of the present invention.

A digital camera system 1 which is the image pickup system according to the present embodiment (hereinafter referred to as a digital camera system) is composed mainly of a camera body 2 which is the image pickup apparatus body (hereinafter referred to as a camera body), an interchangeable lens 3, and the like. In the present embodiment, the interchangeable lens 3 is configured to be detachable from the camera body 2.

The camera body 2 is configured to include a body control portion 10, a solid-state image pickup device 11, an image pickup device interface (IF) portion 12, a shutter mechanism 13, a shutter drive mechanism 14, a ROM 15, a display element drive portion 16, a display element 17, an operation portion 18, a RAM 19, a storage medium 20, and the like.

Note that components included in the camera body 2 include various constituent members in addition to the above-described components, the constituent members other than the above-described components are not directly associated with spirit of the present invention, and that the constituent members are neither shown nor described. Note that constituent members similar to constituent members in practical use in a conventional digital camera system having a general configuration are included as the constituent members neither shown nor described.

The body control portion 10 is a control portion configured to control overall operation of the digital camera system 1 in a centralized manner. The body control portion 10 is a circuit portion functioning as a control portion which processes various control signals for controlling individual constituent units of the digital camera system 1 including the interchangeable lens 3 and also functioning as a signal processing portion which receives an image signal (first image data) acquired by the solid-state image pickup device 11 and performs predetermined signal processing and the like on the image signal. A detailed configuration of the body control portion 10 will be described later.

The solid-state image pickup device 11 (hereinafter simply denoted as the image pickup device 11) is a photoelectric conversion element which receives an optical image formed by an image pickup optical system 41 (to be described later) included in the interchangeable lens 3, sequentially performs photoelectric conversion on the optical image, and outputs image signals including an object image as first image data (e.g., digital image data representing a still image or a movie). For example, a CCD (charge coupled device) image sensor or a CMOS (complementary metal oxide semiconductor) type image sensor is adopted as the image pickup device 11.

The image pickup device interface (IF) portion 12 is a circuit portion which drives and controls the image pickup device 11 under control of the body control portion 10 and passes first image data outputted from the image pickup device 11 to an image processing portion 25 (to be described later) of the body control portion 10.

The shutter mechanism 13 is a mechanism portion which is provided on a front surface side of an image pickup surface of the image pickup device 11 and intended to adjust the amount of exposure to a light beam from an object side which passes through the image pickup optical system 41 (to be described later) of the interchangeable lens 3 and is incident on the image pickup surface of the image pickup device 11.

The shutter drive mechanism 14 is a mechanism portion which drives and controls the shutter mechanism 13 under control of the body control portion 10.

The ROM (read only memory) 15 is a read only semiconductor memory. Program code 15a, a control parameter 15b, and the like which are needed by the digital camera system 1 to operate are stored in advance in the ROM 15, and such program and data are read out by the body control portion 10 as needed.

The display element 17 is a display constituent unit for playing and displaying a still image or a movie on the basis of second image data acquired by the image pickup device 11 and processed by the image processing portion 25 (to be described later) of the body control portion 10, digital image data stored in the storage medium 20 (to be described later), or the like and displaying a menu for setting of the camera body 2. For example, a liquid crystal display (LCD) apparatus or an organic electro-luminescence (OEL) display apparatus is adopted as the display element 17. Note that concrete forms of the display element 17 include, e.g., a monitor composed of a display panel or the like which is disposed with a display surface facing outward on a back surface side of the camera body 2 and a so-called electronic viewfinder in a form of a viewfinder which is peered into through an eyepiece. Either one will do, but both may be included.

The display element drive portion 16 is a circuit portion which drives the display element 17 under control of the body control portion 10 to perform display control.

The operation portion 18 includes a plurality of operation members which work with a plurality of switches for generating various instruction signals when operated by a user. The operation portion 18 includes, for example, a power on/off button, a release button, a play button, a menu button, and an operation mode switching dial.

The RAM (random access memory) 19 is a readable/writable semiconductor memory. An internal area of the RAM 19 includes, for example, a work area 19a and an image area 19b. The work area 19a is a memory area which temporarily stores, for example, a program and data as a processing target. The image area 19b is a memory area which temporarily stores first image data, second image data, and the like.

The storage medium 20 is a recording medium for recording, e.g., an image file 20a based on second image data that is acquired by the image pickup device 11 and is processed by the image processing portion 25 (to be described later) of the body control portion 10. For example, built-in semiconductor memory fixedly provided inside the camera body 2 or card-type semiconductor memory configured to be detachable from the camera body 2 is adopted as the storage medium 20.

A body mount contact 31 is a constituent portion for securing transmission of various control signals between the camera body 2 and the interchangeable lens 3 by being connected to a lens mount contact 48 on the interchangeable lens 3 side when the interchangeable lens 3 is attached to the camera body 2 in a predetermined form. For the reason, the body mount contact 31 is electrically connected to the body control portion 10 on the camera body 2 side.

The body control portion 10 is configured to include a CPU 21, an AF control portion 22, an AE control portion 23, a motion detection portion 24, the image processing portion 25 (including a lens aberration correction portion 26, a noise reduction processing portion 27, an image scaling portion 28, and the like), a communication control portion 29, a memory control portion 30, and the like.

In the body control portion 10, the CPU (central processing unit) 21 is a central computing circuit of the body control portion 10 and is a control circuit portion which performs various control by reading out and executing a program stored in advance in the ROM 15.

The AF control portion 22 is a control circuit portion which controls autofocus operation by controlling the image pickup device IF portion 12, a lens drive mechanism 42 on the interchangeable lens 3 side, and the like.

The AE control portion 23 is a control circuit portion which controls autoexposure operation by controlling the image pickup device IF portion 12, the shutter drive mechanism 14, an aperture drive mechanism 44 on the interchangeable lens 3 side, and the like.

Note that since concrete control by the AF control portion 22, the AE control portion 23, and the like is not directly associated with the present invention, a detailed description of the control will be omitted, and control approximately similar to control adopted in a conventional digital camera system is adopted.

The motion detection portion 24 is a circuit portion which includes a detection element, such as a gyroscope sensor, for detecting a change in posture of the camera body 2. A result of detection by the motion detection portion 24 is utilized to, e.g., control an image stabilization mechanism (not shown).

The image processing portion 25 is a circuit portion which receives an inputted image signal (first image data) acquired by the image pickup device 11, appropriately performs a series of signal processes including at least distortion aberration correction processing on the basis of the image signal, and outputs processed second image data. The image processing portion 25 includes, for example, the lens aberration correction portion 26, the noise reduction processing portion 27, and the image scaling portion 28.

The lens aberration correction portion 26 is a correction circuit portion for performing lens aberration correction processing utilizing a piece of lens characteristic data stored in advance in a lens data storage portion 46 of a lens control portion 45 on the interchangeable lens 3 side.

In other words, the lens aberration correction portion 26 is a correction coefficient calculation portion which compares information on an image height of second image data outputted from the image processing portion 25 and information on an image height range supporting a piece of distortion aberration characteristic information read out from the lens data storage portion 46 of the interchangeable lens 3 and, if the image height of the second image data falls within the image height range, calculates a distortion aberration correction coefficient on the basis of a distortion aberration characteristic corresponding to the image height. The image processing portion 25 performs distortion aberration correction processing using a distortion aberration correction coefficient calculated by the lens aberration correction portion 26 (a correction coefficient calculation portion). Note that details of various processes to be performed in the lens aberration correction portion 26 will be described later.

The noise reduction processing portion 27 is a circuit portion for performing noise reduction processing on an image signal (first image data) or the like as a target which is acquired by the image pickup device 11.

The image scaling portion 28 is a signal processing circuit portion for performing scaling processing based on a user instruction, i.e., so-called electronic zoom processing on an image signal (first image data) acquired by the image pickup device 11.

The communication control portion 29 is a circuit portion which controls communication for transmission of various control signals, various data signals, and the like between the camera body 2 and the interchangeable lens 3. A communication channel between the camera body 2 and the interchangeable lens 3 is established when the body control portion 10 and the lens control portion 45 are electrically connected via the body mount contact 31 and the lens mount contact 48. For the reason, the communication control portion 29, the body mount contact 31, and the lens mount contact 48 constitute a communication portion in the present digital camera system 1. The communication portion is a constituent portion which contributes to, for example, communication for transmission of a piece of distortion aberration characteristic information and information on an image height range read out from the lens data storage portion 46 (a lens characteristic data storage portion) from the interchangeable lens 3 to the camera body 2.

The memory control portion 30 is a circuit portion which controls storage portions, such as the ROM 15, the RAM 19, and the storage medium 20, i.e., memory areas.

The interchangeable lens 3 is a constituent unit configured to be detachable from the camera body 2. The interchangeable lens 3 is configured to include the image pickup optical system 41, the lens drive mechanism 42, the aperture mechanism 43, the aperture drive mechanism 44, the lens control portion 45, the lens data storage portion 46, a zoom position detection portion 47, the lens mount contact 48, a zoom ring 3a as an operation member, and the like.

The zoom ring 3a is turnably provided on an outer peripheral surface of the interchangeable lens 3 and is an operation member for generating a zooming instruction signal at the time of zooming operation. In the case, the zoom ring 3a functions as, for example, an operation member for mechanically causing a zoom optical system (not shown) contributory to zooming of the image pickup optical system inside the interchangeable lens 3 to advance or retreat in a direction along an optical axis O. The zoom ring 3a also functions as an operation member for generating an instruction signal for electronic zoom processing.

The image pickup optical system 41 is a constituent unit which causes a light beam from an object to pass through and an optical image to be formed on a light receiving surface of the image pickup device 11. Although a detailed configuration of the image pickup optical system 41 is not shown, the image pickup optical system 41 is configured to include, for example, a plurality of optical lenses and respective holding members which hold the plurality of optical lenses.

The lens drive mechanism 42 is a mechanism portion for causing a predetermined member of the plurality of holding members corresponding to the plurality of optical lenses constituting the image pickup optical system 41 to advance or retreat in the direction along the optical axis O. For the reason, the lens drive mechanism 42 is composed of a drive motor, a drive cam mechanism, and the like (a detailed description of the lens drive mechanism 42 will be omitted). The lens drive mechanism 42 is driven and controlled by the lens control portion 45 that is controlled under control of the body control portion 10 when the interchangeable lens 3 is attached to the camera body 2.

The aperture mechanism 43 is a constituent unit for adjusting a light amount of a light beam passing through the image pickup optical system 41.

The aperture drive mechanism 44 is a mechanism portion for driving the aperture mechanism 43. The aperture drive mechanism 44 is driven and controlled by the lens control portion 45 that is controlled under control of the body control portion 10 when the interchangeable lens 3 is attached to the camera body 2.

The lens control portion 45 is a control circuit configured to perform overall control on the interchangeable lens 3 side under control of the body control portion 10. The lens control portion 45 is configured to include the lens data storage portion 46 and the like inside.

The lens data storage portion 46 is a memory portion and a lens characteristic data storage portion for storing, in advance, lens data unique to the interchangeable lens 3, such as various pieces of lens data including a piece of lens characteristic data with a distortion aberration coefficient and a lateral chromatic aberration coefficient as well as lens type information.

Lens data to be stored in the lens data storage portion 46 includes a distortion aberration coefficient and a lateral chromatic aberration coefficient. In the present embodiment, pieces of lens data as a plurality of respective lens aberration coefficient sets corresponding to each of a plurality of image height positions is stored in advance in view of image clip processing. FIG. 4 is a list showing a concrete example of lens data to be stored in advance in the lens data storage portion 46. A further detailed description of the lens data will be described later.

The zoom position detection portion 47 is a constituent portion which detects a current zoom position (zooming state) by detecting a position of the zoom ring 3a. The zoom position detection portion 47 also includes a function of detecting a setting for an electronic zoom by detecting an amount by which the zoom ring 3a is operated.

As described above, the lens mount contact 48 is a constituent portion for securing transmission of various control signals between the camera body 2 and the interchangeable lens 3 by being connected to the body mount contact 31 on the camera body 2 side when the interchangeable lens 3 is attached to the camera body 2. For the reason, the lens mount contact 48 is electrically connected to the lens control portion 45 on the interchangeable lens 3 side.

Figure 2:
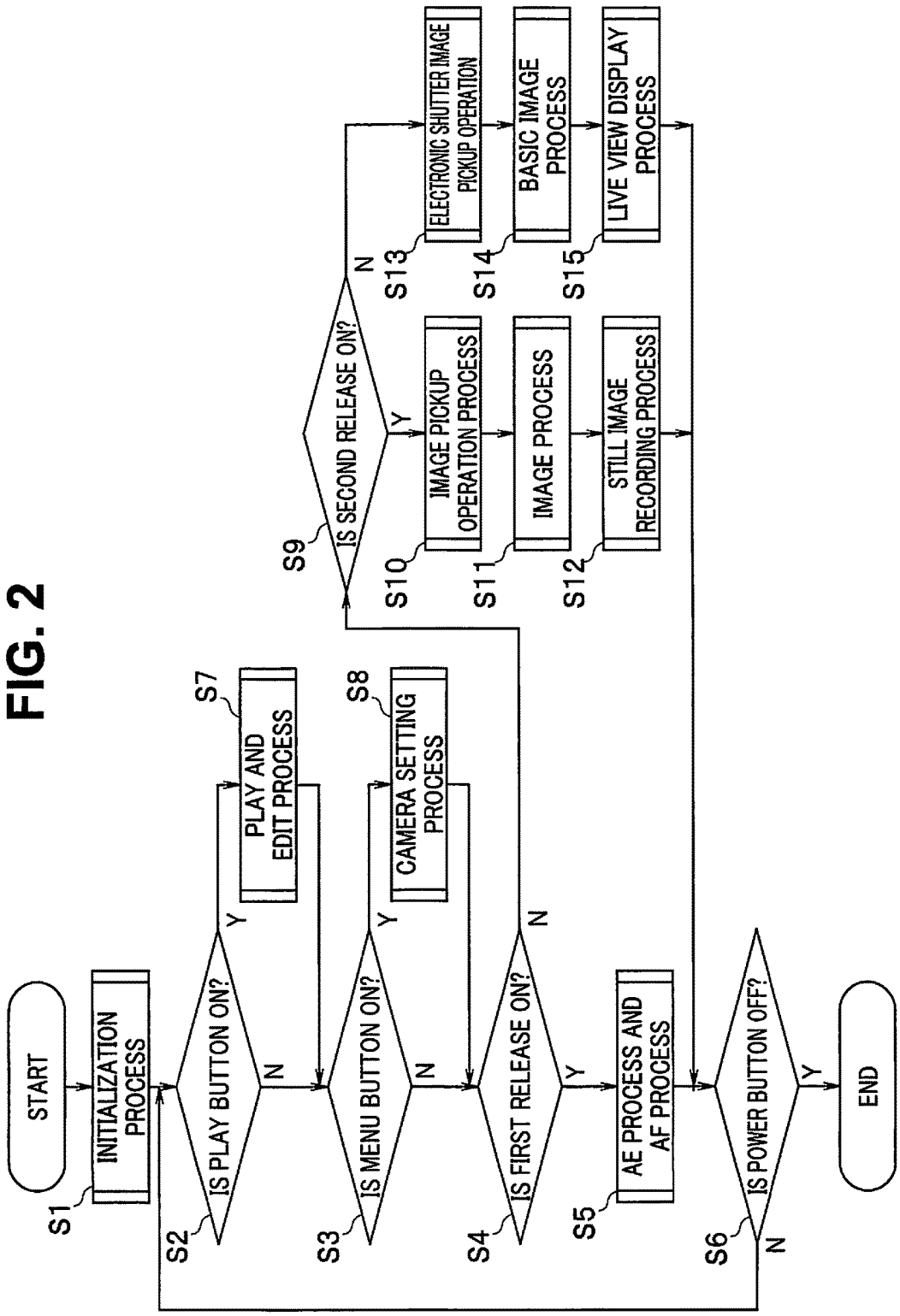
FIG. 2 is a flowchart showing an overall process sequence of the image pickup system in FIG. 1.
Figure 3:
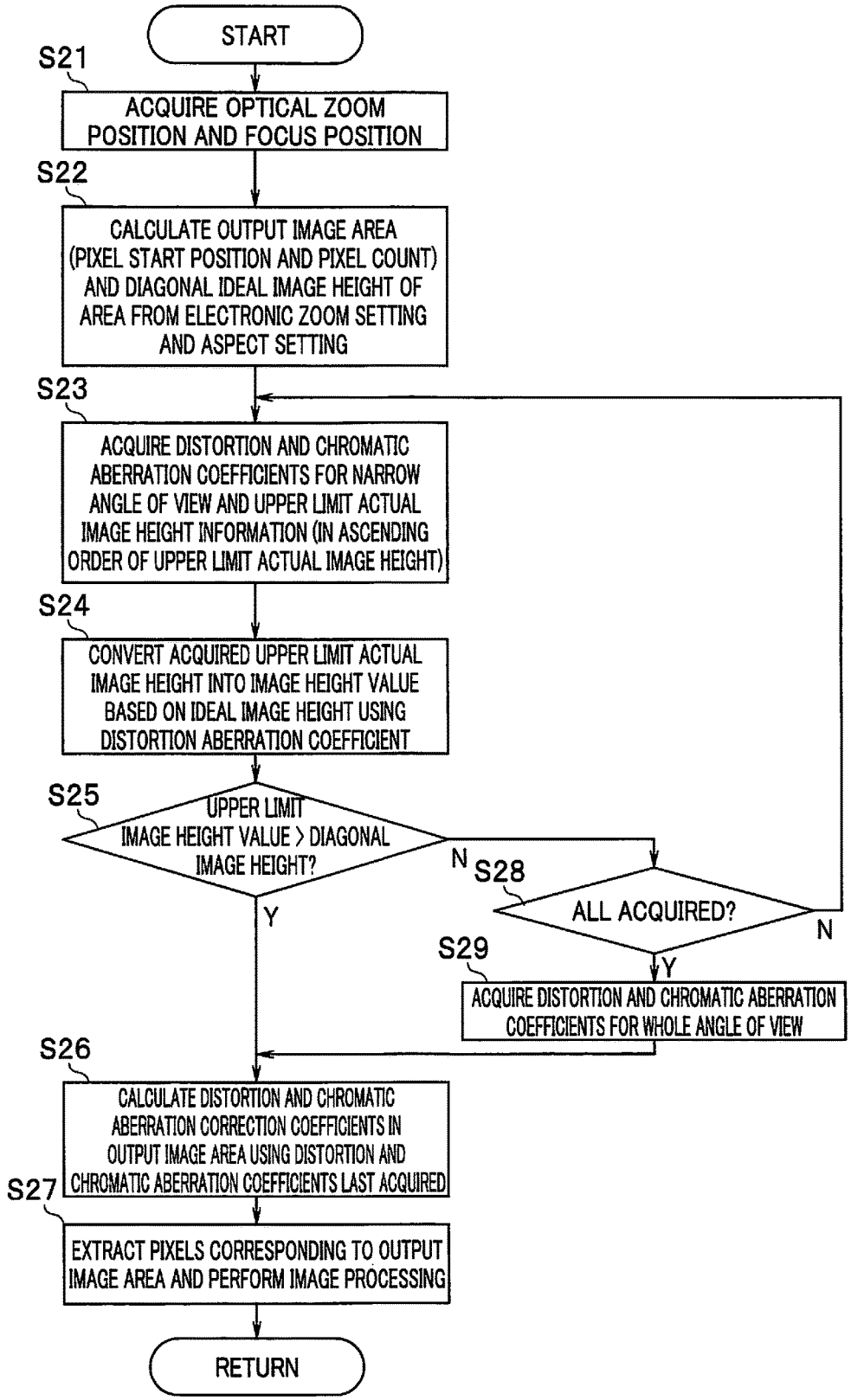
FIG. 3 is a flowchart showing a subroutine for an image process in step S11 of FIG. 2.

Action of the digital camera system 1 according to the present embodiment with the above-described configuration will be briefly described below with reference to FIGS. 2 and 3. FIG. 2 is a flowchart showing an overall process sequence of the digital camera system according to the present embodiment. FIG. 3 is a flowchart showing a subroutine for an image process in step S11 of the process sequence in FIG. 2.

Assume that, in the digital camera system 1 according to the present embodiment, the interchangeable lens 3 is attached in a predetermined form to a predetermined position of the camera body 2. When the power button (not shown) included in the operation portion 18 of the camera body 2 is operated to be on by a user in the state, the process sequence in FIG. 2 starts.

When the process sequence in FIG. 2 starts, the body control portion 10 executes a predetermined initialization process in step S1 of FIG. 2. The initialization process includes, for example, a process of acquiring lens data related to the interchangeable lens 3 attached to the camera body 2 from the lens data storage portion 46. Note that the initialization process is approximately similar to a process to be performed in a conventional digital camera system and that a detailed description of the initialization process will be omitted.

In succeeding step S2, the body control portion 10 watches for an instruction signal from the operation portion 18 and confirms whether the play button is pushed. If a push on the play button (a play on signal) is confirmed, the flow advances to a process in step S7 to shift to a play and edit process sequence which is a subsequence corresponding to play operation mode. When the play and edit process sequence in step S7 ends, the flow returns to the main sequence (return) to advance to a process in step S3. Note that the play and edit process sequence in step S7 is not directly associated with the present invention and that a detailed description of the play and edit process sequence will be omitted.

On the other hand, if the body control portion 10 judges in the process in step S2 that the play button is not pushed, the flow advances to the process in step S3.

In step S3, the body control portion 10 watches for an instruction signal from the operation portion 18 and confirms whether the menu button is pushed. If a push on the menu button (a menu on signal) is confirmed, the flow advances to a process in step S8 to shift to a camera setting process sequence which is a subsequence for making various settings on a camera. When the camera setting process sequence in step S8 ends, the flow returns to the process sequence in FIG. 2 (return) and advances to a process in step S4 of FIG. 2.

Note that types of setting which can be performed by the camera setting process include setting related to an angle of view of an image acquired by image pickup operation, such as electronic zoom magnification setting and aspect ratio setting. Generally, an angle of view of an image acquired in the digital camera system 1 depends on a value for optical focal length of the attached interchangeable lens 3 and size and an aspect ratio of the image pickup surface of the image pickup device 11.

The electronic zoom magnification setting is to set a magnification ratio to the optical focal length of the attached interchangeable lens 3. The setting is enabled in electronic zoom operation processing. The electronic zoom operation processing here performs image clip processing corresponding to a set electronic zoom magnification on image data which can be acquired by image pickup operation, i.e., first image data of maximum size which is acquired by the image pickup device 11 and performs a process (image scaling processing) of, e.g., maintaining image resolution by scaling up an image in a clipped area. Examples of a setup value for the electronic zoom magnification are 1.0×, 1.5×, 2.0×, 3.0×, 4.0× . . .

On the other hand, when the body control portion 10 judges in the process in step S3 that the menu button is not pushed, the flow advances to the process in step S4.

In succeeding step S4, the body control portion 10 watches for an instruction signal from the operation portion 18 and confirms whether a release signal has transitioned from an off state to a first (1st.) release on signal due to a push on the release button. If the release signal is confirmed to have transitioned from the off state to the first (1st.) release on signal, the flow advances to a process in step S5.

Note that the release button in the case is an operation member corresponding to a two-stage switch. The first release on signal is an instruction signal which is generated by first-stage press operation of the release button.

In succeeding step S5, the body control portion 10 executes a predetermined AE process and AF process (subsequence) on the basis of first image data outputted from the image pickup device 11. When the AE process and AF process in step S5 ends, the flow returns to the process sequence in FIG. 2 (return) to advance to a process in step S6 in FIG. 2. Note that the AE process and AF process in step S5 above is also not directly associated with the present invention and that a detailed description of the AE process and AF process will be omitted.

On the other hand, if a transition of the release signal from the off state to the first release on signal is not confirmed by the body control portion 10 in the process in step S4, the flow advances to a process in step S9. Note that a requirement for shift to step S9 in the process in step S4 is that the transition from release off to first release on is not confirmed and that a case where the first release on signal is already generated and is maintained also satisfies the requirement.

In step S9, the body control portion 10 watches for an instruction signal from the operation portion 18 and confirms presence or absence of a second (2nd.) release on signal. If the second (2nd.) release on signal is confirmed, the flow advances to a process in step S10.

In step S10, the body control portion 10 executes a normal image pickup operation process. After the image pickup operation process, the flow advances to a process in step S11. Note that the image pickup operation process executed here is a process similar to a process to be performed in a conventional digital camera system. Thus, a detailed description of the image pickup operation process will be omitted.

In next step S11, the body control portion 10 executes a predetermined image process on first image data acquired in the process in step S10 above. A detailed process sequence of the image process performed here will be described later with reference to FIG. 3. After the image process, the flow advances to a process in step S12.

In succeeding step S12, the body control portion 10 executes a process of recording on the storage medium 20 (a still image recording process) on the first image data obtained by performing predetermined various image processes (e.g., white balance and color temperature conversion processing) in the process in step S11 above. After the recording process, the flow advances to the process in step S6. Note that the still image recording process executed here is a process similar to a process to be performed in a conventional digital camera system. Thus, a detailed description of the still image recording process will be omitted.

On the other hand, if the second release on signal is not confirmed by the body control portion 10 in the process in step S9 above, the flow advances to a process in step S13.

In step S13, the body control portion 10 drives and controls the image pickup device 11 via the image pickup device IF portion 12 and executes electronic shutter image pickup operation. After the electronic shutter image pickup operation, the flow advances to a process in step S14.

In next step S14, the body control portion 10 receives acquired first image data from the image pickup device 11 and sequentially executes basic image processes (a basic image process). After the basic image process, the flow advances to a process in step S15.

In succeeding step S15, the body control portion 10 drives and controls the display element 17 via the display element drive portion 16 and executes a live view display process of sequentially receiving the first image data after the basic image process and continuously displaying the first image data. After the live view display process, the flow advances to the process in step S6.

Note that the respective processes in steps S13, S14, and S15 above are normal processes which are executed at the time of so-called live view display in a conventional common digital camera system. Thus, a detailed description of the processes will be omitted.

When the flow advances to the process in step S6 after each of the process in step S5, the process in step S12, and the process in step S15 described above, in step S6, the body control portion 10 watches for an instruction signal from the operation portion 18 and confirms whether the power button is pushed to transition from an on state to an off state. If a push on the power button and placement in the power off state (a power off signal) are confirmed in step S6, the body control portion 10 executes power off processing and ends a series of processes of the process sequence (end). Note that since the power off processing is also not directly associated with the present invention, a detailed description of the power off processing will be omitted.

On the other hand, if the power off signal is not confirmed in the process in step S6 above, the flow returns to the process in step S2 above.

A main sequence in the digital camera system 1 according to the present embodiment has been described above. Lens data to be stored in advance in the lens data storage portion 46 in the interchangeable lens 3 of the digital camera system 1 according to the present embodiment will be described below.

As described above, the lens data to be stored in advance in the lens data storage portion 46 includes a distortion aberration coefficient, a lateral chromatic aberration coefficient, and the like (see FIG. 4). FIG. 5 is a schematic chart showing a relation among an effective image area of an image pickup device, an image circle of an interchangeable lens, and an image height.

Lens data to be stored in advance in a lens data storage portion of an interchangeable lens in a conventional digital camera system is usually data corresponding to a whole area of an effective image area (see FIG. 5) of an image pickup device. In the case, the lens data is data which corresponds to the approximately rectangular effective image area that fits within an image circle of the corresponding interchangeable lens, a diagonal image height (i.e., an upper limit actual image height) of the image area being 100%. Conventional digital camera systems have never been caused to hold lens data for an image height other than an image height of 100%.

A piece of lens data to be held by the interchangeable lens 3 of the digital camera system 1 according to the present embodiment is the conventional normal data, i.e., a lens aberration data set corresponding to an upper limit actual image height of 100%. More specifically, the interchangeable lens 3 includes two data sets, "distortion aberration coefficient set 0" and "lateral chromatic aberration coefficient set 0", as shown in FIG. 4. Additionally, the interchangeable lens 3 is provided with a plurality of pieces of lens characteristic data, in each of which a piece of distortion aberration characteristic information that can be supported by an image height range narrower than an image circle of the interchangeable lens 3 is associated with a piece of information on an image height range, i.e., a plurality of data sets for narrow angles of view different in upper limit actual image height (%) as pieces of lens data to be held by the interchangeable lens 3.

More specifically, for example, lens aberration data sets ("distortion aberration coefficient set 1" and "lateral chromatic aberration coefficient set 1") corresponding to an upper limit actual image height of 60% and lens aberration data sets ("distortion aberration coefficient set 2" and "lateral chromatic aberration coefficient set 2") corresponding to an upper limit actual image height of 40% are held.

"The aberration coefficient sets" corresponding to each of the upper limit actual image heights each refer to a set of pieces of lens aberration coefficient data when an image height is 100% near an area where a virtual diagonal line connecting an approximately central portion of the light receiving surface of the image pickup device 11 and non-adjacent vertices of the effective image area approximately intersects an outer periphery of the image circle. The image height (%) is set in accordance with length of the virtual diagonal line.

Examples of breakdowns of respective "aberration coefficient sets" in the lens data are shown in FIGS. 6 and 7. FIG. 6 is an illustration of a distortion aberration coefficient set. FIG. 7 is an illustration of a lateral chromatic aberration coefficient set. In FIG. 6, an, bn, and cn (n is an integer) represent aberration coefficients corresponding to each combination of individual focus positions and individual zoom positions. Similarly, in FIG. 7, dn, en, fn, gn, hn, and in (n is an integer) represent aberration coefficients corresponding to each combination of the individual focus positions and the individual zoom positions.

Let Y be an ideal image height (without aberration), and Y' be an actual image height (with aberration). A distortion equation is generally represented as equation (1) below.

$$Y-Y'=aY^3+bY^5+cY^7 \qquad (1)$$

Let YG be an image height of a G component, YR be an image height of an R component, and YB be an image height of a B component. As for lateral chromatic aberration equations, YR and YB can be represented by equations (2) and (3) below.

$$YR=dYG+eYG^3+fYG^5 \qquad (2)$$

$$YB=gYG+hYG^3+iYG^5 \qquad (3)$$

Details of an image process sequence (subroutine) which is the process in step S11 of the main sequence (FIG. 2) in the digital camera system 1 according to the present embodiment will be described below with reference to the flowchart in FIG. 3.

When the flow advances to the process in step S11 of the main sequence in FIG. 2, the flow shifts to the image process sequence in FIG. 3.

First, in step S21 of FIG. 3, the body control portion 10 receives an output from the zoom position detection portion 47, an output from the lens drive mechanism 42, and the like via the lens control portion 45 of the interchangeable lens 3 and acquires pieces of information, such as a zoom position of the zoom optical system (hereinafter referred to as an optical zoom position) included in the image pickup optical system 41 and a focus position of a focus optical system. With the acquisition, how the optical zoom position and the focus position of the image pickup optical system 41 at a present time (i.e., a time point when second release operation is executed) are set is confirmed.

Figures 8, 9:
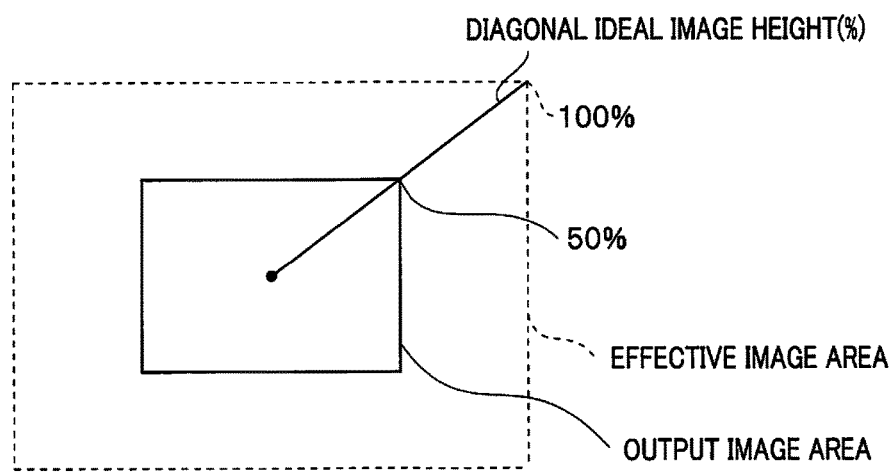
FIG. 8 is a data list showing information (e.g., a pixel start position and a pixel count) on an output image area which is caused to correspond to setup values for an electronic zoom magnification and an aspect ratio and diagonal ideal image height data in the image pickup system in FIG. 1.
FIG. 9 is a chart concretely showing one example of concept at the time of calculating information (e.g., the pixel start position and the pixel count) on the output image area and diagonal ideal image height data from the setup values for the electronic zoom magnification and the aspect ratio in the image pickup system in FIG. 1.

In succeeding step S22, the body control portion 10 performs a process of calculating information (e.g., a pixel start position and a pixel count) on a corresponding output image area and a diagonal ideal image height on the corresponding output image area from a currently set electronic zoom setup value and a currently set aspect setup value set by the camera setting process in step S8 of FIG. 2. In the case, for example, a data list as shown in FIG. 8 may be housed in advance in the lens data storage portion 46 of the interchangeable lens 3. FIG. 8 is a data list showing information (e.g., a pixel start position and a pixel count) on an output image area which is caused to correspond to setup values for the electronic zoom magnification and the aspect ratio and diagonal ideal image height data. Note that information (e.g., a pixel start position and a pixel count) on an output image area depends on a pixel count of the effective image area of the image pickup device 11. Although concrete numerical values of information (e.g., a pixel start position and a pixel count) on an output image area are not shown (are denoted only as " . . . ") in FIG. 8, pixel start position information is actually indicated in a form of, for example, XY coordinates of the output image area. Pixel count information is indicated in a form of a numerical value, such as a total pixel count, or as the numbers of pixels in a longitudinal direction and in a lateral direction.

Figure 10:
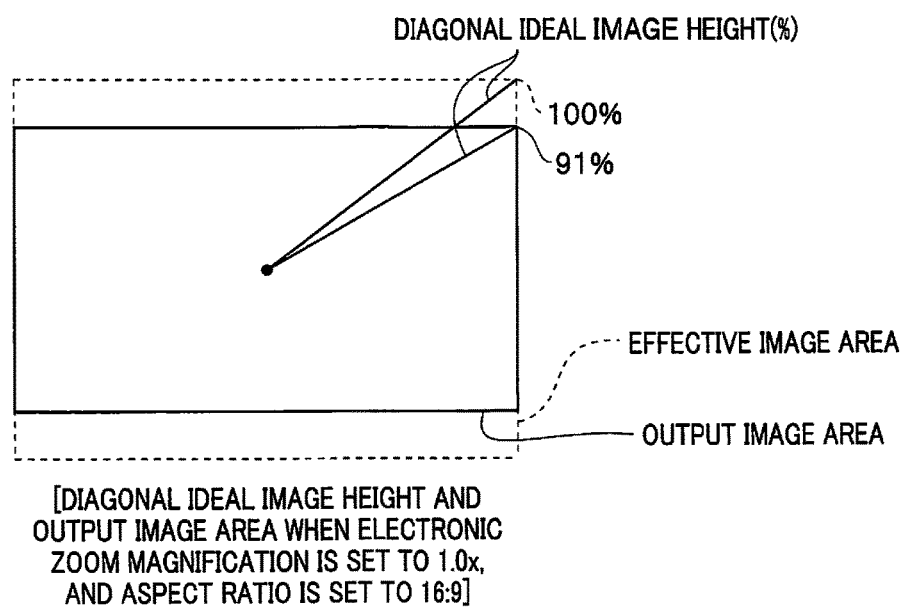
FIG. 10 is a chart concretely showing another one example of concept at the time of calculating information (e.g., the pixel start position and the pixel count) on the output image area and diagonal ideal image height data from the setup values for the electronic zoom magnification and the aspect ratio in the image pickup system in FIG. 1.

FIGS. 9 and 10 are charts concretely showing concept at the time of calculating, from the setup values for the electronic zoom magnification and the aspect ratio, information (e.g., the pixel start position and the pixel count) on the output image area and diagonal ideal image height data.

FIG. 9 is an illustration of calculation of information (e.g., the pixel start position and the pixel count) on the output image area and diagonal ideal image height data in a case where the electronic zoom magnification is set to 2.0× and the aspect ratio is set to 4:3 (see [*1] in FIG. 8). Under the setting, as shown in FIGS. 8 and 9, the diagonal ideal image height of the output image area is 50% with respect to the effective image area (with a diagonal ideal image height of 100%). Information on the output image area, i.e., pieces of information, such as the pixel start position and the pixel count can be acquired with reference to FIG. 8 (concrete numerical values are not shown).

FIG. 10 is an illustration of a case where the electronic zoom magnification is set to 1.0× and the aspect ratio is set to 16:9 (see [*2] in FIG. 8). Under the setting, as shown in FIGS. 8 and 9, the diagonal ideal image height of the output image area is 91% with respect to the effective image area (with the diagonal ideal image height of 100%). Information on the output image area, i.e., pieces of information, such as the pixel start position and the pixel count can be acquired with reference to FIG. 8 (concrete numerical values are not shown).

After the pieces of data, such as the information on the output image area and the diagonal ideal image height, are calculated in the above-described manner, the flow advances to a process in step S23 of FIG. 3.

In step S23, the body control portion 10 acquires, from the lens data storage portion 46 of the interchangeable lens 3, pieces of lens data as distortion aberration coefficients and lateral chromatic aberration coefficients for narrow angles of view and upper limit actual image height data (in ascending order of upper limit actual image height).

In succeeding step S24, the body control portion 10 performs computation that converts the upper limit actual image height data acquired in the process in step S23 above into an upper limit image height value based on an ideal image height, using the distortion aberration coefficients. A computing equation for the conversion is given by equation (4) below.

$$Y'=Y-aY^3-bY^5-cY^7 \qquad (4)$$

Y': actual image height (with aberration)
Y: ideal image height (without aberration)
a, b, c: aberration coefficient In next step S25, the body control portion 10 compares an upper limit image height value with a diagonal image height value. The upper limit image height value is a value of the lens data (the upper limit image height data) read in the process in step S23 above. The diagonal image height value is a value calculated in the process in step S24 above. If the upper limit image height value>the diagonal image height value in the case, the flow advances to a process in step S26.

That is, an upper limit actual image height is set by judging whether an error between an aberration represented by a distortion equation using the lens data housed in advance in the lens data storage portion 46 and an actual optical aberration falls within an allowable range.

Alternatively, the upper limit image height value may be set by judging, for example, whether degree of a distortion represented using the lens data housed in advance in the lens data storage portion 46 is within a range in which correction processing is possible by internal processing in the lens aberration correction portion 26 and the like of the camera body 2, i.e., whether the degree is outside a correctable pixel range.

Even for a skew which is large in degree and is unsuccessfully corrected with high precision and left slightly uncorrected in a case of a whole angle of view, an aberration coefficient which allows high-precision correction can be set by setting an upper limit image height.

In succeeding step S26, the body control portion 10 causes the lens aberration correction portion 26 to calculate a distortion aberration correction coefficient and a lateral chromatic aberration correction coefficient in the output image area using the distortion aberration coefficients and the lateral chromatic aberration coefficients last acquired (see step S23).

In step S27, the body control portion 10 extracts pixels corresponding to the output image area and executes predetermined image processing. After the image processing, the sequence as a series of processes ends, and the flow returns to the original process (the main sequence in FIG. 2).

In step S28, the body control portion 10 confirms whether all pieces of lens data (other than pieces of data for the whole angle of view) have been acquired from the lens data storage portion 46. If it is confirmed that all the pieces have been acquired, the flow advances to a process in step S29. If all the pieces have not been acquired, the flow returns to the process in step S23 above to repeat the subsequent processes.

In step S29, the body control portion 10 acquires pieces of data as distortion aberration coefficients and lateral chromatic aberration coefficients for the whole angle of view. After the acquisition, the flow advances to the process in step S26.

As has been described above, according to the one embodiment, pieces of lens data (e.g., distortion aberration coefficients and lateral chromatic aberration coefficients) for narrow angles of view, image height range information which allows adoption of the pieces of lens data, and the like are prepared in advance in the lens data storage portion 46 on the interchangeable lens 3 side, and the camera body 2 communicates with the interchangeable lens 3, reads the pieces of lens data, the image height range information, and the like caused to be stored in advance from the lens data storage portion 46, and compares the read pieces of data with an image height value of first image data actually acquired by the image pickup device 11. If the read pieces of data can be adopted, i.e., an actual image height falls within an upper limit image height range, the camera body 2 performs aberration correction processing using the read pieces of lens data and then records second image data after the aberration correction.

With the above-described configuration, for example, when image pickup operation using an electronic zoom function is to be performed using the interchangeable lens 3 extreme in distortion, such as a fisheye lens, an angle of view is limited. Higher-precision aberration correction can be performed for a narrower angle of view.

Note that, in the one embodiment, the image pickup device 11 acquires whole image data of the effective image area at the time of the image pickup operation process (the process in step S10 of FIG. 2) and performs a process of clipping image data of the output image area from the whole image data for the effective image area at a final stage (the process in step S27 of FIG. 3) in the sequence of the succeeding image process (the process in step S11 of FIG. 2). The present invention, however, is not limited to the example, and a process sequence as in, for example, a modification shown in FIG. 11 may be employed.

Figure 11:
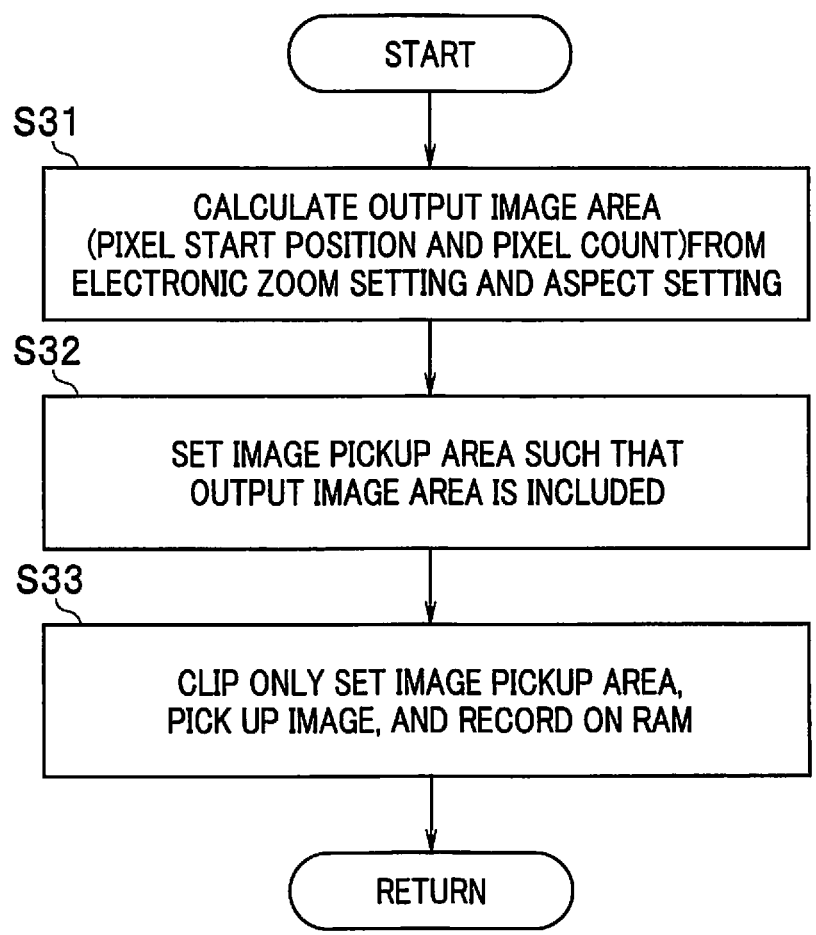
FIG. 11 is a flowchart showing a modification of an image pickup operation process by the image pickup system according to the one embodiment of the present invention.

FIG. 11 is a flowchart showing a modification of the image pickup operation process in the digital camera system according to the one embodiment of the present invention.

In the modification, after a shift to the image pickup operation process, the body control portion 10 first performs a process of calculating information (e.g., a pixel start position and a pixel count) on a corresponding output image area from a current electronic zoom setup value and a current aspect setup value set by the camera setting process (the process in step S8 of FIG. 2) in step S31 of FIG. 11.

In succeeding step S32, the body control portion 10 drives and controls the image pickup device 11 via the image pickup device IF portion 12 and executes predetermined image acquisition operation. In the case, the image pickup device IF portion 12 sets a predetermined image pickup area including the output image area of an effective image area of the image pickup device 11, using the information (e.g., the pixel start position and the pixel count) on the output image area calculated in step S31 above.

In step S33, the body control portion 10 executes image pickup operation to drive the image pickup device 11, performs image pickup targeted for pixels only within the set image pickup area, and temporarily stores acquired image data on the RAM 19. Subsequent image processing is performed on the image data temporarily recorded on the RAM 19. Other actions are similar to actions in the one embodiment.

As described above, according to the modification of the present embodiment, later image processing is performed on image data as a target of an output image area defined through setting of an electronic zoom magnification and an aspect ratio set in advance. The image data in the case is smaller in size than whole image data of the effective image area of the image pickup device. It is thus possible to reduce a load on a control circuit due to image processing and the like and perform higher-speed processing.

At the time of live view image display, a processing load can be reduced by handling only image data of an output image area corresponding to a set electronic zoom magnification and a set aspect ratio, as in the modification. The modification has the advantage of, e.g., being capable of implementing display at a higher frame rate.

For example, the process (the sequence as the series of processes including the process in step S27 of FIG. 3) illustrated in the one embodiment above may be used in still image image pickup mode, and the process illustrated in the modification in FIG. 11 may be performed in movie image pickup mode. The processes may be used differently.

An example of a case where a fisheye lens is used as the interchangeable lens 3 in the digital camera system 1 according to the present embodiment will be described below as another modification.

FIG. 12 is a list showing an example of lens data to be stored in advance in the lens data storage portion 46 in a case where the interchangeable lens 3 is a fisheye lens. As shown in FIG. 12, in the lens data for a fisheye lens, distortion aberration correction data for a case of an upper limit image height of 100%, i.e., for a whole angle of view is disabled. That is, in the case of the fisheye lens, for example, settings are made so as not to perform distortion aberration correction processing when an image is outputted using whole image data of an effective image area of the image pickup device 11. For the reason, as shown in FIG. 12, a piece of data related to distortion aberration correction in the case of the upper limit actual image height of 100% is registered as "correction disabling data" in the lens data for a fisheye lens. Thus, in the case, an image with image skew and the like specific to a fisheye lens is outputted. Other pieces of lens data are similar to the pieces of lens data (see FIG. 4) for the normal interchangeable lens 3 adopted in the present embodiment.

FIG. 13 is a data list (see FIG. 8) of diagonal ideal image height data corresponding to setup values for an electronic zoom magnification and an aspect ratio in the case of a fisheye lens. As shown in FIG. 13, the data list is different from the data list (see FIG. 8) in a case of a normal interchangeable lens in that a minimum electronic zoom magnification which can be set in the case of a fisheye lens is set to "1.6×" that is calculated in "an electronic zoom magnification settable range calculation process" (to be described later) (see FIG. 15). Note that although information (e.g., a pixel start position and a pixel count) on an output image area is not shown in FIG. 13, the pieces of data are pieces of numerical data which are appropriately set.

Figure 14:
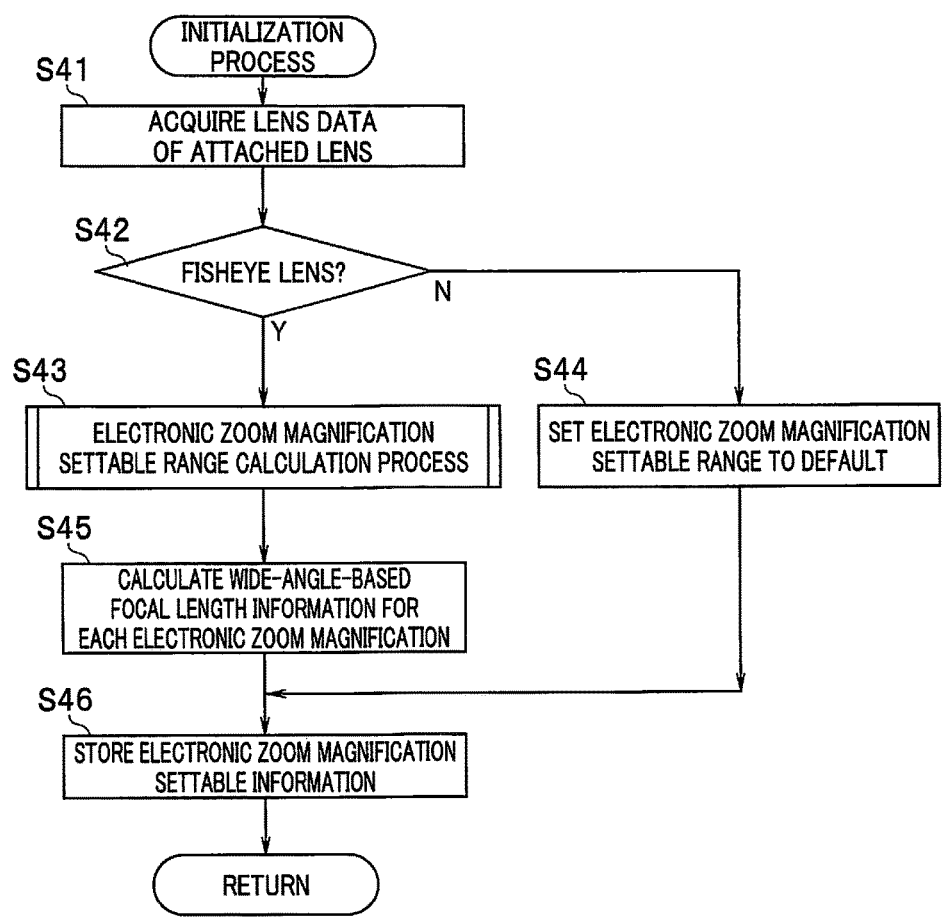
FIG. 14 is a flowchart showing a subroutine for an initialization process in step S1 of the main sequence in FIG. 2 in the image pickup system in FIG. 1.
Figure 15:
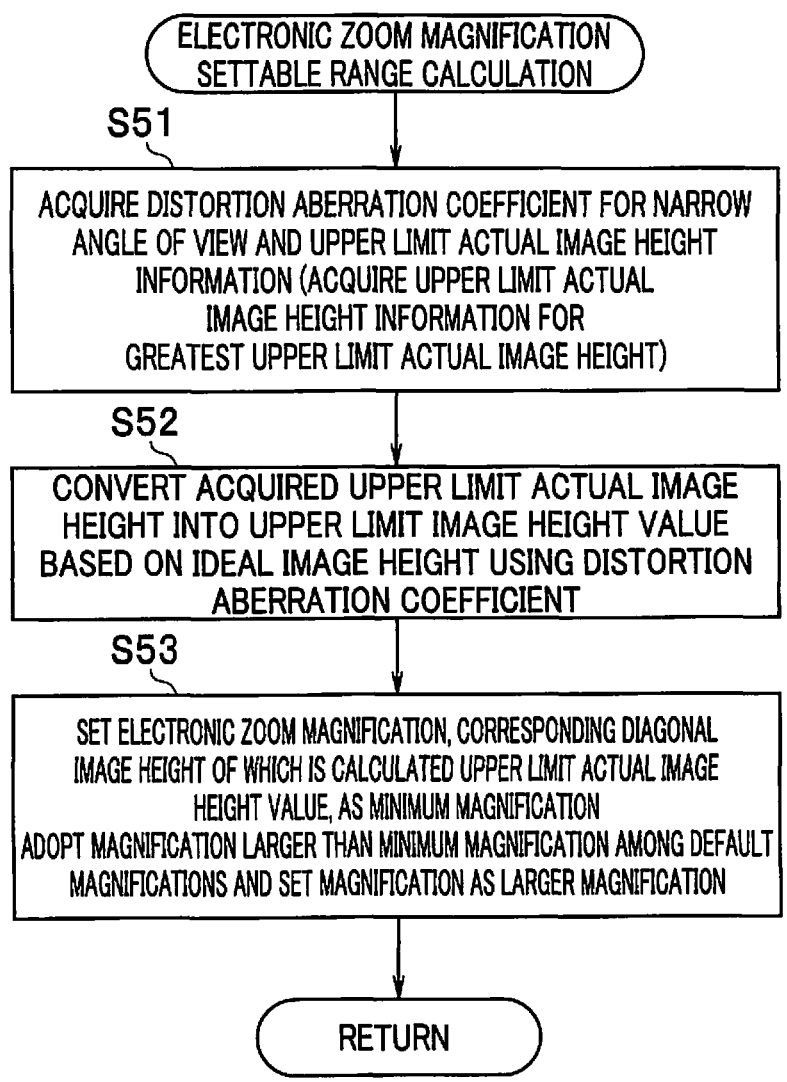
FIG. 15 is a flowchart showing a subroutine for "an electronic zoom magnification settable range calculation process" in step S43 in the initialization process in FIG. 14.

FIG. 14 is a flowchart showing a subroutine for the initialization process in step S1 in the main sequence shown in FIG. 2. FIG. 15 is a flowchart showing a subroutine for a process in step S43 in the initialization process in FIG. 14, i.e., "the electronic zoom magnification settable range calculation process".

When the initialization process is executed in the digital camera system 1, the body control portion 10 communicates with the lens control portion 45 of the interchangeable lens 3 and acquires lens data from the lens data storage portion 46 of the interchangeable lens 3 attached to the camera body 2 in step S41 of FIG. 14.

In step S42, the body control portion 10 confirms on the basis of the acquired lens data whether lens type of the currently attached interchangeable lens 3 is a fisheye lens. If it is confirmed that the lens type of the currently attached interchangeable lens 3 is a fisheye lens, the flow advances to a process in next step S43. If it is confirmed that the lens type of the currently attached interchangeable lens 3 is not a fisheye lens, the flow advances to a process in step S44.

In step S44, the body control portion 10 sets an electronic zoom magnification settable range to a default. The default is, for example, a setting which allows setup values for the electronic zoom magnification to be set to a plurality of stepwise numerical values beginning with 1.0×. The example shown in FIG. 8 illustrates a case where the electronic zoom magnification can be set on a 5-point scale of 1.0×, 1.5×, 2.0×, 3.0×, and 4.0×. Note that the electronic zoom magnification may be steplessly set to any magnification from 1.0× to a predetermined magnification (e.g., 4.0×).

On the other hand, if it is judged in the process in step S42 above that a fisheye lens is attached, and the flow advances to the process in step S43, the body control portion 10 shifts to "the electronic zoom magnification settable range calculation process in step S43. The subroutine for "the electronic zoom magnification settable range calculation process is as shown in FIG. 15.

That is, in step S51 of FIG. 15, the body control portion 10 refers to the lens data (lens data for a fisheye lens) read and temporarily stored in the RAM 19 in the process in step S41 above and acquires distortion aberration coefficients for narrow angles of view and upper limit actual image height information. In the case, the body control portion 10 acquires distortion aberration coefficients and upper limit actual image height information for a greatest upper limit actual image height. In the example shown in FIG. 12, a piece of lens data for narrow angles of view in a case of an upper limit actual image height of 60%.

In step S52, the body control portion 10 performs computation that converts an acquired upper limit actual image height value into an upper limit image height value based on an ideal image height, using the distortion aberration coefficients (see equation (4) above).

In step S53, the body control portion 10 sets as a minimum magnification an electronic zoom magnification, a corresponding diagonal image height of which is the calculated upper limit actual image height value. Magnification values larger than a value of the minimum magnification are adopted among default magnification values and are set as magnification values larger than the set minimum magnification value. In the example shown in FIG. 13, the acquired upper limit actual image height value is 60%, and the upper limit image height value based on the ideal image height after the conversion is 62%.

As shown in FIG. 8, since a diagonal ideal image height when the electronic zoom magnification is 1.5× is 66%, 1.5× cannot be adopted as the minimum magnification. When the upper limit image height value is 62%, the electronic zoom magnification is 1.6×. The value is set as the minimum magnification, and 2.0×, 3.0×, and 4.0× are set as subsequent magnifications. After the setting, the process sequence ends, and the flow returns to the original process (return).

Refer back to FIG. 14. In step S45, the body control portion 10 calculates wide-angle-based focal length information for each electronic zoom magnification. Generally, focal length information for a fisheye lens and focal length information for a normal wide-angle lens are different in notation. As described above, it would be convenient to have information indicating to which focal length and which angle of view in a case of acquisition by a normal wide-angle lens an image range when a predetermined area is clipped with a set electronic zoom magnification from image data acquired using a fisheye lens corresponds.

For the reason, the present embodiment is configured such that an equivalent focal length corresponding to an angle of view (an image range) of an image obtained at an electronic zoom magnification can be calculated and such that the display element 17 can be caused to display the equivalent focal length. With the configuration, a user can easily grasp a condition of an image range to be acquired at the time of electronic zoom setting operation.

Let Y be an image height, f be a lens focal length, and θ be an angle (a half angle of view) of incidence on a lens. In a fisheye lens based on a general equivalent projection method, $Y=f\cdot\theta$ holds. Note that, in a normal lens, $Y=f\cdot\tan\theta$ holds.

In the above-described case, an equivalent focal length is obtained in the manner below. Assume a diagonal length of an image pickup device to be D (mm), a focal length of a fisheye lens to be F (mm), and a diagonal image height at a given electronic zoom magnification to be z (%). A wide-angle-based focal length (equivalent focal length) F' (mm) at the electronic zoom magnification is given by:

$$F'=D/2\cdot\tan\phi$$

where $\phi=z\cdot\theta$, and
$\theta=D/2F$.

Figures 16, 17:
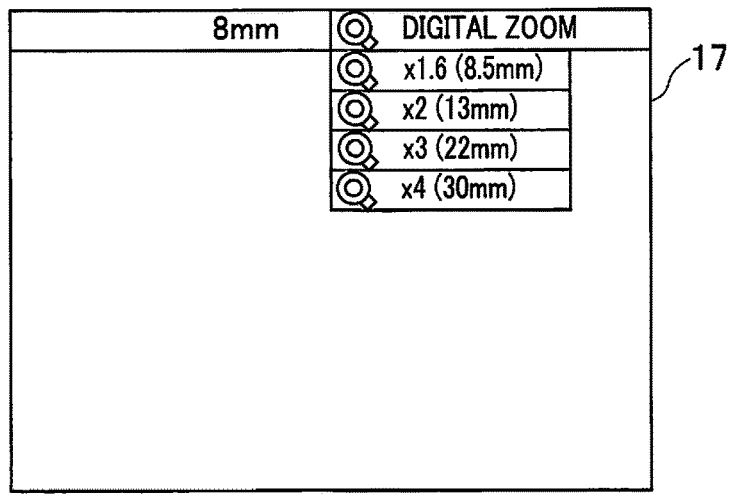
FIG. 16 is an illustration of a list with comparison between a settable electronic zoom magnification and a reduced focal length in the case employing the fisheye lens in the image pickup system in FIG. 1.
FIG. 17 is a view conceptually showing one example of a user interface which allows setting of the electronic zoom magnification in the image pickup system in FIG. 1.

FIG. 16 is an illustration of a list with comparison between a settable electronic zoom magnification and an equivalent focal length. In the case, an original focal length of a fisheye lens is employed when the electronic zoom magnification is 1.0×, and a corresponding equivalent focal length is not available.

FIG. 17 is a view conceptually showing one example of a user interface which allows setting of the electronic zoom magnification and shows a display screen of the display element provided at the camera body of the digital camera system according to the present embodiment.

For example, when operation for setting the electronic zoom magnification is performed, an electronic zoom magnification selection and setting display is displayed in, for example, pull-down form on the display screen of the display element 17 so as to be superimposed on a live view display that continuously and sequentially displays images being continuously acquired by the image pickup device 11. In the case, as for the electronic zoom magnification to be displayed, only settable numerical values are displayed. A user performs predetermined operation on a predetermined operation member provided on the camera body 2 or a touch panel provided on the display screen of the display element 17 and selects and sets a desired electronic zoom magnification.

Note that a user interface for setting the electronic zoom magnification is not limited to the illustration and that other various forms are conceivable. For example, a form in which a slide bar is displayed on the display screen, and a user slides and operates a setting bar on the slide bar is conceivable. A case of the form can support not only stepwise zoom magnification setting but also stepless zoom magnification setting.

Refer back to FIG. 14, in step S46, the body control portion 10 stores electronic zoom magnification settable information. After the storage, the process sequence ends, and the flow returns to the original process (return).

As has been described above, if a fisheye lens is attached as the interchangeable lens 3 to the camera body 2, the attachment is automatically confirmed. At the time of image pickup operation involving electronic zoom operation, it is possible to exclude an uncorrectable range and perform appropriate distortion aberration correction processing and the like at any time by automatically setting an electronic zoom magnification settable range. Thus, even if a fisheye lens is used, a skewless wide-angle image can be acquired. If electronic zoom operation is not performed, an image with image skew and the like specific to a fisheye lens can be outputted. Thus, a photographic representation obtained by selecting a fisheye lens as the interchangeable lens 3 can be provided.

Each process sequence described in each of the embodiment and the modifications of the embodiment allows change of procedure as long as the change does not run counter to nature. As for the process sequence, for example, order of execution of individual process steps may be changed, a plurality of process steps may be simultaneously executed, or order of the individual process steps may be different with each execution of the sequence as a series of processes. That is, a description of operation flows in the claims, the specification, and the drawings using the term "first," "next," and the like for sake of convenience does not mean that performance in an order indicated by the terms is essential. Individual steps constituting each of the operation flows may, of course, be omitted in a portion which does not affect inner nature of the invention.

Of the techniques described here, control and functions described mainly with reference to the flowcharts can often be set by a software program. The above-described control and functions can be implemented by a computer reading and executing the software program. The software program is electronic data, a whole or part of which is stored or recorded in advance in the above-described storage medium or storage portion, such as a portable medium like a flexible disk, a CD-ROM, or nonvolatile memory or a storage medium like a hard disk or volatile memory, as a computer program product in a product manufacturing process. Alternatively, the software program can be distributed or provided at the time of product shipping or via a portable medium or a communication line. A user can cause such software programs to operate even after product shipping by voluntarily downloading the software programs via a communication network, the Internet, or the like and installing the software programs on a computer or installing the software programs from a storage medium on the computer. An image pickup apparatus according to the present embodiment can be easily implemented.

The present invention is not limited to the above-described embodiment, and various modifications and applications may, of course, be made without departing from gist of the invention. Additionally, the embodiment includes inventions in various stages, and various inventions can be extracted by appropriately combining a plurality of disclosed components. For example, even if several components are omitted from all the components illustrated in the one embodiment, a configuration in which the several components are omitted can be extracted as an invention as long as the problems to be solved by the invention can be solved, and the advantageous effects of the invention can be obtained. Furthermore, components in different embodiments may be appropriately combined. The invention is only limited by the accompanying claims and not limited by a specific embodiment.

The present invention is not limited to a digital camera system which is an electronic instrument specializing in an image pickup function capable of acquiring image data and can be widely applied to an electronic instrument in any other form including a similar image pickup function, such as a cellular phone, a smartphone, an electronic notebook, an electronic dictionary, a personal digital assistant, a personal computer, a tablet-type terminal instrument, a handheld game instrument, a handheld television, a wristwatch, a portable small clock, or a navigation instrument utilizing the GPS (global positioning system), and various electronic instruments including an image pickup function.

The present invention can be similarly applied to an electronic instrument which includes a function of acquiring image data using a solid-state image pickup device and displaying an image on a display apparatus on the basis of the acquired image data, such as an observation electronic instrument like a telescope, binoculars, or a microscope.

What is claimed is:

1. An image pickup system comprising an image pickup apparatus body and an interchangeable lens detachable from the image pickup apparatus body,
the interchangeable lens comprising
a lens characteristic data storage portion including at least one of a memory and a storage medium, and being configured to store distortion aberration characteristic information which can be supported by an image height range narrower than an image circle of the interchangeable lens in association with information on the image height range, and
a communication portion including body and lens mount contacts, and being capable of communicating the distortion aberration characteristic information and the information on the image height range read out from the lens characteristic data storage portion with the image pickup apparatus body,
the image pickup apparatus body comprising
a solid-state image pickup device configured to photoelectrically convert an optical image formed through the interchangeable lens and output first image data,
an image processing circuit configured to receive the first image data, perform a series of image processes including at least distortion aberration correction processing, and output second image data, and
a correction coefficient calculation circuit configured to compare information on an image height of the second image data outputted from the image processing circuit with the information on the image height range that can support the distortion aberration characteristic information read out from the interchangeable lens and, if the image height of the second image data falls within the image height range, calculate a distortion aberration correction coefficient on the basis of a distortion aberration characteristic corresponding to the image height,
wherein the image processing circuit performs the distortion aberration correction processing using the distortion aberration correction coefficient calculated by the correction coefficient calculation circuit.

2. The image pickup system according to claim 1, wherein
the image pickup apparatus body further comprises a user interface which allows setting of an electronic zoom magnification,
the solid-state image pickup device photoelectrically converts partial image data in an image height area of image data which can be acquired by the solid-state image pickup device in accordance with the zoom magnification set through the user interface and outputs the image data as the first image data, and
the correction coefficient calculation circuit compares information on an image height of the area of the first image data with the information on the image height range that can support the distortion aberration characteristic information read out as the information on the image height of the second image data from the interchangeable lens and, if the image height of the area of the first image data falls within the image height range, calculates the distortion aberration correction coefficient on the basis of a distortion aberration characteristic corresponding to the image height.

3. The image pickup system according to claim 1, wherein
the image pickup apparatus body further comprises a user interface which allows setting of an electronic zoom magnification,
the image processing circuit clips and processes a partial image in an image height area of the inputted first image data in accordance with the zoom magnification set through the user interface and outputs the second image data, and
the correction coefficient calculation circuit compares an image height of the image in the clipped area with the information on the image height range that can support the distortion aberration characteristic information read out as the information on the image height of the second image data from the interchangeable lens and, if the image height of the image in the clipped area falls within the image height range, calculates the distortion aberration correction coefficient on the basis of a distortion aberration characteristic corresponding to the image height.

4. An image pickup apparatus comprising:
a solid-state image pickup device configured to photoelectrically convert an optical image formed through an optical lens and output first image data;
an image processing circuit configured to receive the first image data, perform a series of image processes including at least distortion aberration correction processing, and output second image data; and
a correction coefficient calculation circuit configured to compare information on an image height of the second image data outputted from the image processing circuit with information on an image height range which can support distortion aberration characteristic information read out from an interchangeable lens and, if the image height of the second image data falls within the image height range, calculate a distortion aberration correction coefficient on the basis of a distortion aberration characteristic corresponding to the image height,
wherein the image processing circuit performs the distortion aberration correction processing using the distortion aberration correction coefficient calculated by the correction coefficient calculation circuit.

5. A method for use with an image pickup system comprising an image pickup apparatus body and an interchangeable lens detachable from the image pickup apparatus body, the method comprising:
storing, in the interchangeable lens, distortion aberration characteristic information which can be supported by an image height range narrower than an image circle of the interchangeable lens in association with information on the image height range;
communicating, from the interchangeable lens to the image pickup apparatus body, the distortion aberration characteristic information and the information on the image height range;
photoelectrically converting an optical image formed through the interchangeable lens to generate first image data;
performing a series of image processes including at least distortion aberration correction processing on the first image data to generate second image data;
comparing information on an image height of the second image data with the information on the image height range that can support the distortion aberration characteristic information; and
responsive to a determination that the image height of the second image data falls within the image height range, calculating a distortion aberration correction coefficient on the basis of a distortion aberration characteristic corresponding to the image height,
wherein the distortion aberration correction processing is performed using the distortion aberration correction coefficient calculated.

6. The method of claim 5, further comprising:
receiving a user input setting an electronic zoom magnification;
photoelectrically converting partial image data in an image height area of image data which can be acquired by a solid-state image pickup device of the image pickup apparatus body in accordance with the zoom magnification received and outputting the image data as the first image data;
comparing information on an image height of the area of the first image data with the information on the image height range that can support the distortion aberration characteristic information read out as the information on the image height of the second image data from the interchangeable lens; and
responsive to a determination that the image height of the area of the first image data falls within the image height range, calculating the distortion aberration correction coefficient on the basis of a distortion aberration characteristic corresponding to the image height.

7. The method of claim 5, further comprising:
receiving a user input setting an electronic zoom magnification;
clipping and processing a partial image in an image height area of the inputted first image data in accordance with the zoom magnification received to generate the second image data;
comparing an image height of the image in the clipped area with the information on the image height range that can support the distortion aberration characteristic information read out as the information on the image height of the second image data from the interchangeable lens; and
responsive to a determination that the image height of the image in the clipped area falls within the image height range, calculating the distortion aberration correction coefficient on the basis of a distortion aberration characteristic corresponding to the image height.

8. A method for use with an image pickup apparatus, the method comprising:
photoelectrically converting an optical image formed through an optical lens to generate first image data;
performing a series of image processes, including at least distortion aberration correction processing on the first image data, to generate second image data;
comparing information on an image height of the second image data with information on an image height range which can support distortion aberration characteristic information read out from an interchangeable lens; and
calculating, responsive to a determination that the image height of the second image data falls within the image height range, a distortion aberration correction coefficient on the basis of a distortion aberration characteristic corresponding to the image height,
wherein the distortion aberration correction processing is performed using the distortion aberration correction coefficient calculated.

9. A non-transitory computer readable medium storing program instructions which, when executed by an image pickup system comprising an image pickup apparatus body and an interchangeable lens detachable from the image pickup apparatus body, cause the image pickup system to perform a method comprising:
storing, in the interchangeable lens, distortion aberration characteristic information which can be supported by an image height range narrower than an image circle of the interchangeable lens in association with information on the image height range;
communicating, from the interchangeable lens to the image pickup apparatus body, the distortion aberration characteristic information and the information on the image height range;
photoelectrically converting an optical image formed through the interchangeable lens to generate first image data;
performing a series of image processes including at least distortion aberration correction processing on the first image data to generate second image data;
comparing information on an image height of the second image data with the information on the image height range that can support the distortion aberration characteristic information; and
responsive to a determination that the image height of the second image data falls within the image height range, calculating a distortion aberration correction coefficient on the basis of a distortion aberration characteristic corresponding to the image height,
wherein the distortion aberration correction processing is performed using the distortion aberration correction coefficient calculated.

10. The non-transitory computer readable medium of claim 9, wherein the method further comprises:
receiving a user input setting an electronic zoom magnification;
photoelectrically converting partial image data in an image height area of image data which can be acquired by a solid-state image pickup device of the image pickup apparatus body in accordance with the zoom magnification received and outputting the image data as the first image data;
comparing information on an image height of the area of the first image data with the information on the image height range that can support the distortion aberration characteristic information read out as the information on the image height of the second image data from the interchangeable lens; and
responsive to a determination that the image height of the area of the first image data falls within the image height range, calculating the distortion aberration correction coefficient on the basis of a distortion aberration characteristic corresponding to the image height.

11. The non-transitory computer readable medium of claim 9, wherein the method further comprises:
receiving a user input setting an electronic zoom magnification;
clipping and processing a partial image in an image height area of the inputted first image data in accordance with the zoom magnification received to generate the second image data;
comparing an image height of the image in the clipped area with the information on the image height range that can support the distortion aberration characteristic information read out as the information on the image height of the second image data from the interchangeable lens; and
responsive to a determination that the image height of the image in the clipped area falls within the image height range, calculating the distortion aberration correction coefficient on the basis of a distortion aberration characteristic corresponding to the image height.

12. A non-transitory computer readable medium storing program instructions which, when executed by an image pickup apparatus, cause the image pickup apparatus to perform a method comprising:
photoelectrically converting an optical image formed through an optical lens to generate first image data;
performing a series of image processes, including at least distortion aberration correction processing on the first image data, to generate second image data;
comparing information on an image height of the second image data with information on an image height range which can support distortion aberration characteristic information read out from an interchangeable lens; and
calculating, responsive to a determination that the image height of the second image data falls within the image height range, a distortion aberration correction coefficient on the basis of a distortion aberration characteristic corresponding to the image height,
wherein the distortion aberration correction processing is performed using the distortion aberration correction coefficient calculated.

* * * * *